US010473126B2

(12) United States Patent
Harada

(10) Patent No.: US 10,473,126 B2
(45) Date of Patent: Nov. 12, 2019

(54) HYDRAULIC CONTROL DEVICE

(71) Applicant: HONDA MOTOR CO., LTD., Minato-ku, Tokyo (JP)

(72) Inventor: Masamichi Harada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/056,578

(22) Filed: Aug. 7, 2018

(65) Prior Publication Data
US 2019/0048898 A1 Feb. 14, 2019

(30) Foreign Application Priority Data

Aug. 10, 2017 (JP) ................. 2017-155235

(51) Int. Cl.
| F15B 11/17 | (2006.01) |
| F15B 11/16 | (2006.01) |
| F16H 61/00 | (2006.01) |
| F16H 59/74 | (2006.01) |
| F16H 59/44 | (2006.01) |

(Continued)

(52) U.S. Cl.
CPC ............ *F15B 11/165* (2013.01); *F15B 11/17* (2013.01); *F16H 61/0031* (2013.01); *F15B 2211/20515* (2013.01); *F15B 2211/20523* (2013.01); *F15B 2211/20576* (2013.01); *F15B 2211/2658* (2013.01); *F15B 2211/633* (2013.01); *F15B 2211/6343* (2013.01); *F15B 2211/6651* (2013.01); *F16H 59/44* (2013.01); *F16H 59/52* (2013.01); *F16H 59/72* (2013.01); *F16H 59/74* (2013.01); *F16H 2059/746* (2013.01)

(58) Field of Classification Search
CPC ................ F16H 61/0031; F16H 59/74; F16H 2059/746; F16H 59/72; F15B 11/165; F15B 11/17; F15B 2211/6651; F15B 2211/2658; F15B 2211/20523; F15B 2211/20515; F15B 2211/20576; F15B 2211/633
USPC ..................... 701/57, 60; 475/137
See application file for complete search history.

(56) References Cited

U.S. PATENT DOCUMENTS

| 2011/0129356 A1* | 6/2011 | Kobayashi | .............. F04C 2/102 |
| | | | 417/44.1 |
| 2012/0141297 A1* | 6/2012 | Jeong | ....................... B60K 6/48 |
| | | | 417/5 |

(Continued)

FOREIGN PATENT DOCUMENTS

| JP | 2014-181768 | 9/2014 |
| JP | 2015-200369 | 11/2015 |
| JP | 2016-176525 | 10/2016 |

*Primary Examiner* — Roger L Pang
(74) *Attorney, Agent, or Firm* — Amin, Turocy & Watson LLP

(57) ABSTRACT

In a control unit of a hydraulic control device, a workload calculation unit calculates the amount of workload cut in a first pump when supply of first oil from the first pump to a continuously variable transmission mechanism through a check valve is switched to supply of second oil from a second pump to the continuously variable transmission mechanism. A workload determination unit determines whether the amount of workload loss of an ACG is more than the amount of workload cut. A motor controller stops a motor or decreases a rotation number if the workload determination unit determines that the amount of workload loss is more than the amount of workload cut.

5 Claims, 4 Drawing Sheets

(51) Int. Cl.
*F16H 59/52* (2006.01)
*F16H 59/72* (2006.01)

(56) References Cited

U.S. PATENT DOCUMENTS

| | | | |
|---|---|---|---|
| 2012/0209495 A1* | 8/2012 | Sakai | B60K 6/485 |
| | | | 701/102 |
| 2018/0073628 A1 | 3/2018 | Mouri et al. | |
| 2019/0048867 A1* | 2/2019 | Harada | F04B 49/022 |
| 2019/0048868 A1* | 2/2019 | Harada | F04B 49/20 |

* cited by examiner ial No. 2017-155235
HYDRAULIC CONTROL DEVICE

CROSS-REFERENCE TO RELATED APPLICATION

This application is based upon and claims the benefit of priority from Japanese Patent Application No. 2017-155235 filed on Aug. 10, 2017, the contents of which are incorporated herein by reference.

BACKGROUND OF THE INVENTION

Field of the Invention

The present invention relates to a hydraulic control device that has, between a first pump and a hydraulic operation unit, a second pump and a check valve connected in parallel, and that supplies first oil from the first pump to the hydraulic operation unit through the check valve, or pressurizes the first oil with the second pump and supplies the first oil that has been pressurized to the hydraulic operation unit as second oil.

Description of the Related Art

For example, Japanese Laid-Open Patent Publication No. 2015-200369 discloses a hydraulic control device in a transmission of a vehicle that has, between a first pump (mechanical pump) and a hydraulic operation unit of the transmission, a second pump (electric pump) and a check valve connected in parallel. In this case, when an engine is started, first of all, first oil is supplied from the first pump to the hydraulic operation unit through the check valve. After that, the second pump is driven to pressurize the first oil that is supplied from the first pump and supplies the first oil that is pressurized from the second pump to the hydraulic operation unit as second oil.

SUMMARY OF THE INVENTION

When the supply of the second oil with the high pressure from the second pump to the hydraulic operation unit is started, the driving torque of the first pump is reduced so as to reduce the pressure of the first oil. Thus, the workload of the engine can be reduced.

In this case, when the engine of the vehicle including the transmission is rotated, a power generator such as an alternating-current power generator (ACG) generates power. With the power supplied from the power generator, the motor is rotated to drive the second pump. The amount of power generated by the power generator is more than the amount of power to be supplied to the motor. Therefore, the excessive amount of generated power corresponds to an amount of workload loss in regard to the supply of the second oil from the second pump to the hydraulic operation unit.

As a result, even if the workload of the first pump is reduced by driving the second pump in order to improve the fuel efficiency of the vehicle, the fuel efficiency may rather deteriorate depending on the balance between the workload that is cut in the first pump (the amount of workload cut) and the amount of workload loss.

The present invention is an improvement of the hydraulic control device according to Japanese Laid-Open Patent Publication No. 2015-200369, and an object is to provide a hydraulic control device that can supply oil to a hydraulic control unit efficiently without deteriorating the fuel efficiency of a vehicle.

The present invention relates to a hydraulic control device including, between a first pump and a hydraulic operation unit of a transmission, a second pump and a check valve connected in parallel and configured to supply first oil from the first pump to the hydraulic operation unit through the check valve, or pressurize the first oil that is supplied from the first pump with the second pump and supply the first oil that has been pressurized to the hydraulic operation unit as second oil.

In this case, the first pump is a mechanical pump configured to be driven by an engine of a vehicle including the transmission. In addition, the second pump is an electric pump configured to have a smaller capacity than that of the first pump and to be driven by a motor that rotates by power supplied from a power generator that generates power by a rotation of the engine.

In order to achieve the above object, the hydraulic control device includes a workload calculation unit, a workload determination unit, and a motor controller.

The workload calculation unit is configured to calculate an amount of workload cut in the first pump when supply of the first oil from the first pump to the hydraulic operation unit through the check valve is switched to supply of the second oil from the second pump to the hydraulic operation unit. The workload determination unit is configured to determine whether an amount of workload loss based on an amount of power generated by the power generator is more than the amount of workload cut. The motor controller is configured to stop the motor or decrease a rotation number of the motor if the workload determination unit determines that the amount of workload loss is more than the amount of workload cut.

If the amount of workload loss is more than the amount of workload cut, driving the second pump may rather deteriorate the fuel efficiency of the vehicle. In such a case, the motor is stopped or the rotation number is decreased, so that the second pump is stopped or set into a low-rotation state. Thus, the second pump is operated normally only when it is expected that the fuel efficiency is improved. As a result, the oil can be supplied efficiently to the hydraulic operation unit without deteriorating the fuel efficiency. In addition, since the second pump is not driven wastefully, abrasion of the rotating parts of the second pump and deterioration of durability can be suppressed.

Here, the workload calculation unit may be configured to calculate a first workload of the first pump when the first pump supplies the first oil to the hydraulic operation unit through the check valve, a second workload of the first pump when the first pump supplies the first oil to the second pump in a case where the second pump is driven, and a workload of the second pump, and calculate the amount of workload cut by subtracting the second workload and the workload of the second pump from the first workload. Thus, the workload determination unit can perform the determination process accurately.

Moreover, the workload calculation unit may be configured to calculate an amount of workload reduction based on the amount of workload cut by subtracting the second workload and the amount of workload loss from the first workload, the workload determination unit may be configured to determine whether the amount of workload reduction is more than a predetermined threshold, and in a case where the workload determination unit determines that the amount of workload reduction is less than or equal to the threshold, the motor controller may be configured to stop the motor or decrease the rotation number of the motor.

By setting the threshold in this manner, the workload determination unit can perform the determination process accurately in consideration of a certain degree of margin. As described above, the amount of workload loss is a workload based on the amount of power generated by the power generator, and since the motor is driven by the power supplied from the power generator and the second pump is driven by the motor, the amount of workload loss includes the workload of the second pump.

Note that the threshold is set on a basis of a weight of the vehicle, a type of a power plant of the vehicle including the engine and the transmission, a place to which the vehicle is shipped, a vehicle speed of the vehicle, or an oil temperature of the first oil or the second oil.

Furthermore, even if the amount of workload loss is less than or equal to the amount of workload cut, the motor controller may be configured to stop the motor or decrease the rotation number of the motor when fuel cut for the engine is performed. Thus, it is possible to prevent the driving of the second pump from canceling out the improvement of the fuel efficiency by the fuel cut.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a hydraulic control device according to the present invention will hereinafter be described in detail with reference to the attached drawings.

1. Structure of the Present Embodiment

Figure 1:
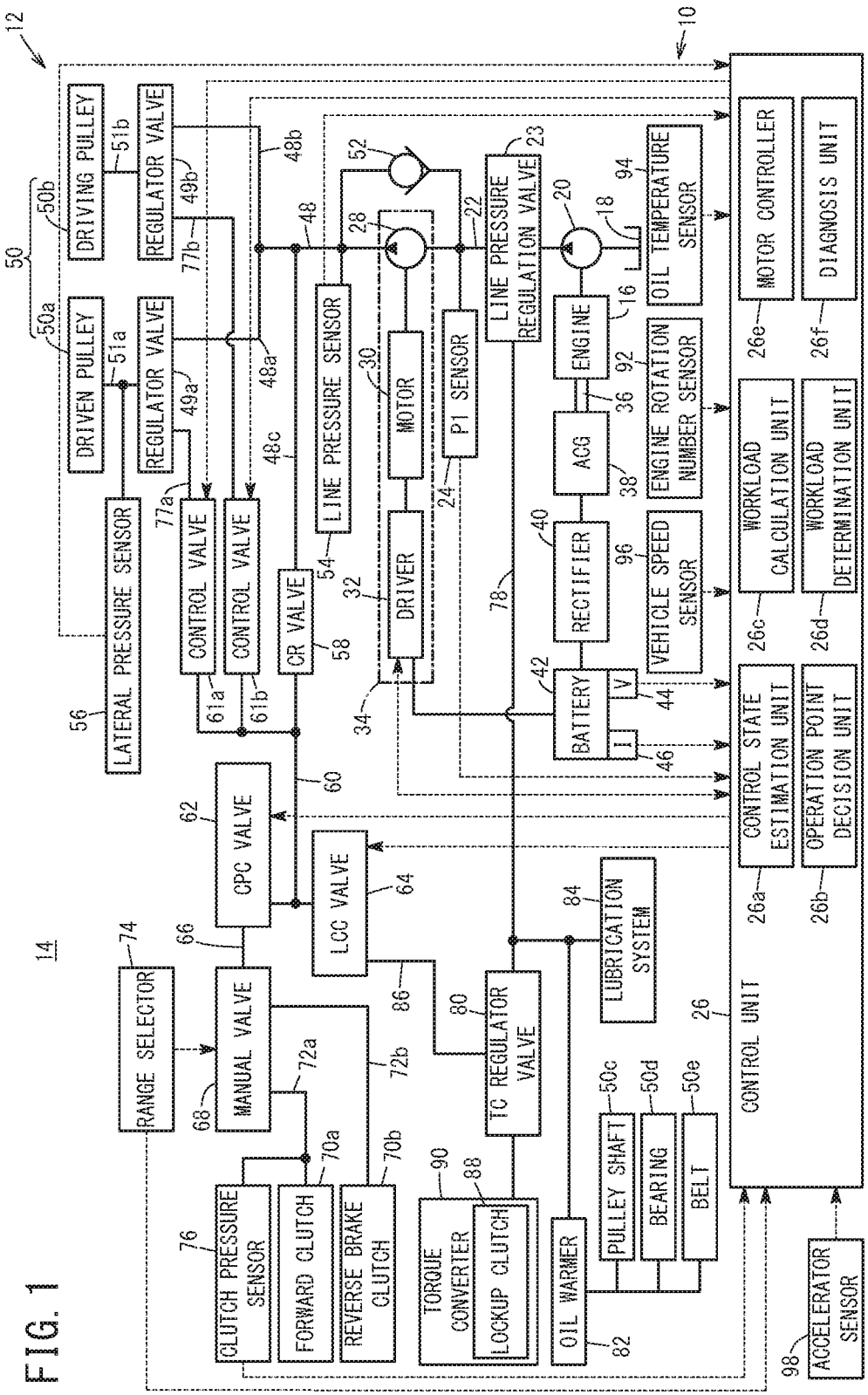
FIG. 1 is a structure diagram of a hydraulic control device according to the present embodiment.

FIG. 1 is a structure diagram of a hydraulic control device 10 according to the present embodiment. The hydraulic control device 10 is used in, for example, a vehicle 14 including a transmission 12 corresponding to a continuously variable transmission (CVT).

The hydraulic control device 10 includes a first pump (mechanical pump) 20 that is driven by an engine 16 of the vehicle 14 and pumps up oil (hydraulic oil) stored in a reservoir 18 and transfers the oil with pressure. An output side of the first pump 20 is connected to an oil passage 22. The oil that is transferred with pressure from the first pump 20 flows as first oil in the oil passage 22. In the middle of the oil passage 22, a line pressure regulation valve 23 corresponding to a spool valve is provided.

In the oil passage 22, an output pressure sensor (P1 sensor) 24 is disposed downstream of the line pressure regulation valve 23. The output pressure sensor 24 sequentially detects a pressure P1 of the first oil (the output pressure of the first pump 20) flowing in the oil passage 22, and sequentially outputs a detection signal expressing the detected output pressure P1 to a control unit 26 that will be described later. On the downstream side in the oil passage 22, a second pump 28 that is smaller in capacity than the first pump 20 is connected.

The second pump 28 is an electric pump that is driven by a rotation of a motor 30 included in the vehicle 14, and that outputs second oil, or the first oil that is supplied through the oil passage 22. In this case, the second pump 28 can pressurize the first oil that is supplied, and transfer the first oil that has been pressurized as the second oil. The motor 30 rotates under a control of a driver 32. The driver 32 controls the driving of the motor 30 on the basis of a control signal supplied from the control unit 26, and moreover, sequentially outputs a signal expressing a driving state of the motor 30 (for example, a rotation number (rotation speed) Nem of the motor 30 in accordance with a rotation number (rotation speed) Nep of the second pump 28) to the control unit 26. The second pump 28, the motor 30, and the driver 32 form an electric pump unit 34.

On the other hand, an alternating-current power generator (ACG) 38 is connected to a crankshaft 36 of the engine 16. The ACG 38 generates power by a rotation of the crankshaft 36 as the engine 16 is driven. The alternating-current power generated by the ACG 38 is rectified by a rectifier 40, and a battery 42 is charged with the rectified power. The battery 42 includes a voltage sensor 44 that detects a voltage V of the battery 42, and a current sensor 46 that detects a current I flowing from the battery 42. The voltage sensor 44 sequentially detects the voltage V of the battery 42, and sequentially outputs the detection signal expressing the detected voltage V to the control unit 26. The current sensor 46 sequentially detects the current I flowing from the battery 42, and sequentially outputs the detection signal expressing the detected current I to the control unit 26. The driver 32 is driven by the power supplied from the battery 42.

An output side of the second pump 28 is connected to an oil passage 48. The oil passage 48 is branched into two oil passages 48a, 48b on the downstream side. The one oil passage 48a is connected through a regulator valve 49a and an oil passage 51a to a driven pulley 50a included in a continuously variable transmission mechanism 50 of the transmission 12. The other oil passage 48b is connected through a regulator valve 49b and an oil passage 51b to a driving pulley 50b included in the continuously variable transmission mechanism 50.

Between the two oil passages 22, 48, a check valve 52 and the second pump 28 are connected in parallel. The check valve 52 is a non-return valve provided to bypass the second pump 28, and allows the oil (first oil) to flow from the oil passage 22 on the upstream side to the oil passage 48 on the downstream side, and prevents the oil (second oil) from flowing from the oil passage 48 on the downstream side to the oil passage 22 on the upstream side.

A line pressure sensor 54 is disposed in the oil passage 48. The line pressure sensor 54 sequentially detects a pressure (line pressure) PH of the oil flowing in the oil passage 48, and sequentially outputs the detection signal expressing the detected line pressure PH to the control unit 26. In the oil passage 51a, a lateral pressure sensor 56 is disposed. The lateral pressure sensor 56 detects a pressure of the oil to be supplied to the driven pulley 50*a* (a pulley pressure corresponding to the lateral pressure of the driven pulley 50*a*).

A CR valve 58 is connected to the downstream side of an oil passage 48*c* that is branched from the oil passage 48. The upstream side of the CR valve 58 is connected to the oil passage 48*c*, and the downstream side of the CR valve 58 is connected to two control valves 61*a*, 61*b*, a CPC valve 62, and an LCC valve 64 through an oil passage 60. The CR valve 58 is a reducing valve. The CR valve 58 reduces the pressure of the oil (second oil) supplied from the oil passage 48*c*, and supplies the oil with the reduced pressure to the control valves 61*a*, 61*b*, the CPC valve 62, and the LCC valve 64 through the oil passage 60.

The upstream side of the CPC valve 62 is connected to the oil passage 60, and the downstream side thereof is connected to a manual valve 68 through an oil passage 66. The CPC valve 62 is a solenoid valve for a forward clutch 70*a* and a reverse brake clutch 70*b*. In this case, while the control signal is supplied from the control unit 26 to make current flow in the solenoid, the CPC valve 62 is open to connect the oil passages 60, 66 to each other and thus, the oil is supplied to the manual valve 68.

The upstream side of the manual valve 68 is connected to the oil passage 66, and the downstream side thereof is connected to the forward clutch 70*a* through an oil passage 72*a* and moreover connected to the reverse brake clutch 70*b* through an oil passage 72*b*. The manual valve 68 is a spool valve. When a driver operates a range selector 74 provided near the driver's seat in the vehicle 14 to select any one of shift ranges such as P (parking), R (reverse), N (neutral), and D (forward, drive), the spool that is not shown is moved by a predetermined amount in an axial direction in accordance with the selected shift range. Thus, the manual valve 68 supplies the oil that is supplied through the oil passage 66, to the forward clutch 70*a* through the oil passage 72*a*, so that the vehicle 14 can travel in a forward direction. Alternatively, the manual valve 68 supplies the oil that is supplied through the oil passage 66, to the reverse brake clutch 70*b* through the oil passage 72*b*, so that the vehicle 14 can travel in a reverse direction. In the middle of the oil passage 72*a*, a clutch pressure sensor 76 is provided. The clutch pressure sensor 76 detects the pressure of the oil supplied to the oil passage 72*a* (a clutch pressure).

Each of the control valves 61*a*, 61*b* is a normally open electromagnetic valve with a solenoid. The control valves 61*a*, 61*b* are closed while the control signal (current signal) is supplied from the control unit 26 and current flows in the solenoid, and on the other hand, the control valves 61*a*, 61*b* are open while current does not flow in the solenoid.

The one control valve 61*a* is a solenoid valve for the driven pulley 50*a*, and when the valve is open, the oil supplied from the CR valve 58 through the oil passage 60 is supplied to the regulator valve 49*a* through an oil passage 77*a*. The other control valve 61*b* is a solenoid valve for the driving pulley 50*b*, and when the valve is open, the oil supplied from the CR valve 58 through the oil passage 60 is supplied to the regulator valve 49*b* through an oil passage 77*b*.

Therefore, the one regulator valve 49*a* uses the pressure of the oil supplied from the control valve 61*a* through the oil passage 77*a*, as a pilot pressure. If the line pressure PH of the oil supplied through the oil passages 48, 48*a* is more than or equal to a predetermined pressure, the regulator valve 49*a* is open to supply the oil to the driven pulley 50*a* through the oil passage 51*a*. In addition, the other regulator valve 49*b* uses the pressure of the oil supplied from the control valve 61*b* through the oil passage 77*b*, as a pilot pressure. If the line pressure PH of the oil supplied through the oil passages 48, 48*b* is more than or equal to the predetermined pressure, the regulator valve 49*b* is open to supply the oil to the driving pulley 50*b* through the oil passage 51*b*. The control valves 61*a*, 61*b* can regulate the pressure of the oil output to the oil passages 77*a*, 77*b*, respectively.

To an oil passage 78 branched from the oil passage 22 through the line pressure regulation valve 23, a hydraulic operation unit of a low-pressure system is connected. To the hydraulic operation unit, the first oil is supplied through the oil passage 78. The line pressure regulation valve 23 is a spool valve. The line pressure regulation valve 23 normally connects between the first pump 20, and the second pump 28 and the check valve 52 through the oil passage 22, and by a displacement of the spool that is not shown, connects between the oil passage 22 and the oil passage 78 so that the first oil flows to the oil passage 78. The hydraulic operation unit of the low-pressure system includes a TC regulator valve 80, an oil warmer 82, a lubrication system 84 for the transmission 12, and the like that are connected to the downstream side of the oil passage 78. The TC regulator valve 80 is connected to the LCC valve 64 through an oil passage 86, and the downstream side of the TC regulator valve 80 is connected to a torque converter 90 incorporating a lockup clutch 88.

The LCC valve 64 is a solenoid valve for the lockup clutch 88. While the control signal is supplied from the control unit 26 to make current flow in the solenoid, the LCC valve 64 is open to connect the oil passages 60, 86 to each other, and thus the oil is supplied to the TC regulator valve 80. The TC regulator valve 80 is a spool valve. When the spool that is not shown is operated in the axial direction in accordance with the pressure of the oil supplied from the LCC valve 64 through the oil passage 86, the pressure of the first oil supplied through the oil passage 78 is reduced and the first oil with the reduced pressure is supplied to the torque converter 90 and the lockup clutch 88.

The oil warmer 82 warms up the first oil supplied from the oil passage 78 to a predetermined temperature, and supplies the first oil that is warmed to a pulley shaft 50*c*, a bearing 50*d*, and a belt 50*e* included in the continuously variable transmission mechanism 50. The lubrication system 84 lubricates various components such as bearings and gears in the transmission 12.

Note that in the line pressure regulation valve 23, the pressure of the first oil flowing in the oil passage 78 may be lower than the output pressure PH of the first oil flowing in the second pump 28 and the check valve 52 through the oil passage 22. Therefore, in the description below, the first oil flowing in the oil passage 78 may be referred to as third oil and the pressure of the third oil may be referred to as a pressure P3.

The hydraulic control device 10 further includes an engine rotation number sensor 92, an oil temperature sensor 94, a vehicle speed sensor 96, an acceleration sensor 98, and the control unit 26. The engine rotation number sensor 92 sequentially detects the engine rotation number New of the engine 16 in accordance with the rotation number Nmp of the first pump 20, and sequentially outputs the detection signal expressing the detected engine rotation number New (rotation number Nmp) to the control unit 26. The oil temperature sensor 94 sequentially detects a temperature (oil temperature) To of the first oil or the second oil, and sequentially outputs the detection signal expressing the detected oil temperature To to the control unit 26. The vehicle speed sensor 96 sequentially detects a vehicle speed Vs of the vehicle 14, and sequentially outputs the detection signal expressing the detected vehicle speed Vs to the control unit 26. The accelerator sensor 98 sequentially detects the opening of an accelerator pedal (not shown) that is operated by the driver, and sequentially outputs the detection signal expressing the detected opening to the control unit 26.

The control unit 26 is a microcomputer such as a CPU functioning as a transmission control unit (TCU) that controls the transmission 12 or an engine control unit (ECU) that controls the engine 16. The control unit 26 achieves the functions of a control state estimation unit 26a, an operation point decision unit 26b, a workload calculation unit 26c, a workload determination unit 26d, a motor controller 26e, and a diagnosis unit 26f by reading and executing programs stored in a storage unit that is not shown.

The control state estimation unit 26a estimates (grasps) the state of the hydraulic control by the hydraulic control device 10 on the basis of the detection results from the above sensors. The operation point decision unit 26b decides the operation point of the second pump 28 on the basis of the estimation result in the control state estimation unit 26a.

The workload calculation unit 26c calculates the workload to be cut in the first pump 20 (the amount of workload cut) when supply of the first oil from the first pump 20 to the continuously variable transmission mechanism 50 through the check valve 52 is switched to supply of the second oil from the second pump 28 to the continuously variable transmission mechanism 50.

Note that the switch between the first oil and the second oil to the continuously variable transmission mechanism 50 is achieved by opening and closing the check valve 52. That is to say, when the amount of discharge (flow rate) of the second oil from the second pump 28 exceeds the flow rate of the first oil (the amount of discharge of the first oil from the first pump 20) that passes the check valve 52, the pressure of the oil (the line pressure PH) on the oil passage 48 side in the check valve 52 becomes higher than the pressure of the oil (the output pressure P1) on the oil passage 22 side. Thus, the check valve 52 is closed and the supply of the first oil from the first pump 20 to the continuously variable transmission mechanism 50 and the like through the check valve 52 and the oil passage 48 is switched to the supply of the second oil from the second pump 28 to the continuously variable transmission mechanism 50 and the like through the oil passage 48. As a result, the flow of the first oil to the oil passage 48 is stopped and the second pump 28 transfers the second oil with pressure to the continuously variable transmission mechanism 50 and the like. In a case where the amount of discharge of the second pump 28 is reduced due to the stop or low-rotation state of the second pump 28, for example, the check valve 52 is opened to supply the first oil to the continuously variable transmission mechanism 50.

The workload determination unit 26d determines whether the amount of workload loss based on the amount of power generated by the ACG 38 (the workload of power generation by ACG 38) is more than the amount of workload cut.

The motor controller 26e sets a command value for the motor 30 on the basis of the determination result in the workload determination unit 26d, and outputs the control signal based on the set command value to the driver 32. For example, if the workload determination unit 26d determines that the amount of workload loss is more than the amount of workload cut, the motor controller 26e sets the command value so as to stop the motor 30 or decrease the rotation number Nem and supplies the control signal based on the set command value to the driver 32. The diagnosis unit 26f diagnoses the state of each part of the vehicle 14 including the hydraulic control device 10 and the transmission 12 on the basis of the detection results from the above sensors and the driver's intention (for example, the driver's operation on the accelerator pedal).

Since the transmission 12 is a known continuously variable transmission, detailed description thereof is not given herein.

2. Operation of the Present Embodiment

An operation of the hydraulic control device 10 according to the present embodiment with the above structure will be described with reference to FIG. 2 to FIG. 4. Here, description is given concerning a process in the control unit 26 for improving the fuel efficiency of the vehicle 14 by appropriately operating the second pump 28 in consideration of the workloads of the first pump 20, the second pump 28, and the ACG 38.

<2. 1 Description of Principle of Operation Process>

Figure 2:
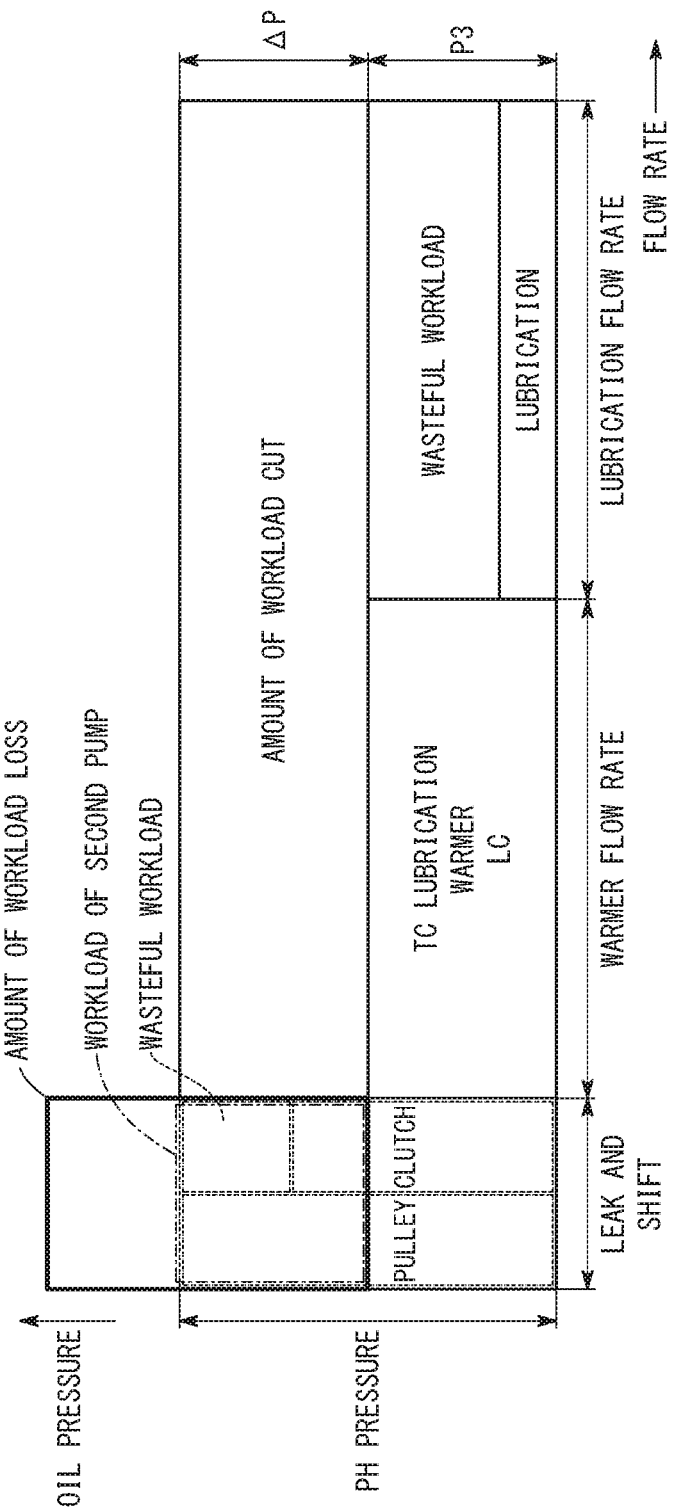
FIG. 2 is an explanatory diagram schematically illustrating workloads of the hydraulic control device in FIG. 1.

FIG. 2 is an explanatory diagram schematically illustrating the workload of the hydraulic control device 10. In FIG. 2, the horizontal axis shows the flow rate of oil (first to third oil), and the vertical axis shows oil pressure (the pressure P3 of the third oil, the line pressure PH).

As illustrated in FIG. 2, the hydraulic control device 10 requires the following flow rates (1) to (3) of the oil in order to perform the hydraulic control on the transmission 12.

(1) A flow rate of the oil to be supplied to the driven pulley 50a and the driving pulley 50b in the continuously variable transmission mechanism 50, and a flow rate of the oil to be supplied to the forward clutch 70a and the reverse brake clutch 70b. These flow rates correspond to the portion denoted as "LEAK AND SHIFT" in FIG. 2. In these flow rates, the "PULLEY" part corresponds to the flow rate of the oil to be supplied to the continuously variable transmission mechanism 50, and the "CLUTCH" part corresponds to the flow rate of the oil to be supplied to the forward clutch 70a and the reverse clutch 70b. These flow rates include the flow rate necessary in the shift operation in the transmission 12, and the leak amount in the valves and oil passages to the continuously variable transmission mechanism 50 and the forward clutch 70a and the reverse clutch 70b.

(2) A flow rate of the oil to be supplied to the torque converter 90 including the lockup clutch 88, and the oil warmer 82. This flow rate corresponds to the portion denoted as "WARMER FLOW RATE" in FIG. 2. This flow rate includes the leak amount in the valves and oil passages to the torque converter 90 and the oil warmer 82, and the flow rate of the oil to be supplied to the pulley shaft 50c, the bearing 50d, and the belt 50e that are connected to the downstream side of the oil warmer 82.

(3) A flow rate of the oil to be supplied to the lubrication system 84. This flow rate corresponds to the portion denoted as "LUBRICATION FLOW RATE" in FIG. 2. This flow rate includes the leak amount in the valves and oil passages to the lubrication system 84.

On the other hand, the pressures of the first to third oil change depending on whether the first pump 20 is operated alone or both the first pump 20 and the second pump 28 are operated.

When the first pump 20 is operated alone, it is necessary to supply the first oil from the first pump 20 to the continuously variable transmission mechanism 50 through the check valve 52; therefore, the pressure of the first oil is the line pressure PH (PH pressure). In this case, it is necessary that the first pump 20 supply the first oil to the continuously variable transmission mechanism 50 with the first oil pressurized up to the line pressure PH in which a differential pressure $\Delta P$ ($\Delta P=PH-P3$) is added to the pressure P3 of the third oil (the pressure of the first oil before pressurized). In this case, the workload of the first pump 20 (a first workload) when the first pump 20 is operated alone is obtained by multiplying the line pressure PH by the "LEAK AND SHIFT", "WARMER FLOW RATE", and "LUBRICATION FLOW RATE". The output pressure sensor 24 detects the line pressure PH as the output pressure P1.

On the other hand, when both the first pump 20 and the second pump 28 are operated, it is only necessary that the first pump 20 supply the first oil to the second pump 28 through the oil passage 22; thus, the pressure of the first oil is reduced to the pressure P3. As a result, the second pump 28 pressurizes the first oil from the pressure P3 to the line pressure PH, and supplies the first oil that is pressurized to the continuously variable transmission mechanism 50 as the second oil. That is to say, the second pump 28 pressurizes the first oil by the differential pressure $\Delta P$, and supplies the first oil to the continuously variable transmission mechanism 50 as the second oil. Note that the output pressure sensor 24 detects the pressure P3 as the output pressure P1.

The second pump 28 is a small-capacity electric pump, and performs the work of the portion drawn with the dash-dot line in FIG. 2. In this case, the workload of the second pump 28 is obtained by multiplying the differential pressure $\Delta P$ by the flow rate of "LEAK AND SHIFT".

In the transmission 12, the oil to be supplied to the continuously variable transmission mechanism 50 has the highest pressure, and the oil to be supplied to the forward clutch 70a and the reverse brake clutch 70b has the second highest pressure. Therefore, in the workload of the second pump 28 of FIG. 2, the block with dashed line above "CLUTCH" is a wasteful work for the second pump 28. That is to say, when the oil with the pressure equivalent to that to the continuously variable transmission mechanism 50 is supplied to the forward clutch 70a and the reverse brake clutch 70b, a loss due to the "WASTEFUL WORKLOAD" occurs.

When the second pump 28 is operated, the work in the first pump 20 can be cut by the "AMOUNT OF WORKLOAD CUT" in FIG. 2. That is to say, the workload of the first pump 20 (a second workload) is obtained by multiplying the pressure P3 by the flow rates of "LEAK AND SHIFT", "WARMER FLOW RATE", and "LUBRICATION FLOW RATE".

Note that in the hydraulic operation unit of the low-pressure system in the transmission 12, the pressure of the oil to be supplied to the lubrication system 84 is the lowest. Therefore, in FIG. 2, the block between the "AMOUNT OF WORKLOAD CUT" and "LUBRICATION" in the second workload is a wasteful work for the first pump 20. That is to say, when the oil with the pressure equivalent to that in the torque converter 90, the oil warmer 82, or the like is supplied to the lubrication system 84, a loss due to the "WASTEFUL WORKLOAD" still occurs. When the vehicle 14 cruises, the lateral pressure (pulley pressure) may be lower than the pressure P3. The present embodiment, however, will describe it on the basis of the illustration in FIG. 2.

As described above, the battery 42 is charged with the power generated by the ACG 38 through the rectifier 40, and when the power is supplied from the battery 42 to the driver 32 and the motor 30 is driven under a control operation of the driver 32, the second pump 28 is operated. In this case, the ACG 38 loses a workload exceeding the power necessary to drive the motor 30 (the second pump 28). Therefore, the amount of power generated in the ACG 38 corresponds to the amount of workload loss related to the supply of the second oil by the second pump 28 (the workload of generating power by ACG 38). In FIG. 2, the amount of workload loss of the ACG 38 is drawn with thick line, and a part of the workload loss is the workload by the second pump 28.

Note that the ACG 38 serves to supply power to each part of the vehicle 14, but the present embodiment only handles the power to be consumed by the second pump 28. In this case, the workload of generating power by the ACG 38 is obtained by: (the workload of generating power by ACG 38)=(the power consumed by the second pump 28)/(the power generation efficiency of the ACG 38).

In this manner, while the workload of the first pump 20 (the workload of the engine 16 to drive the first pump 20) is cut by the driving of the second pump 28, the amount of workload loss of the ACG 38 occurs additionally. Therefore, from the viewpoint of improving the fuel efficiency of the vehicle 14, the second pump 28 is preferably driven in consideration of the balance between the amount of workload cut in the first pump 20 and the amount of workload loss of the ACG 38.

That is to say, as illustrated in FIG. 3A, if the amount of workload cut in the first pump 20 is more than the amount of workload loss of the ACG 38, the entire workload of the hydraulic control device 10 can be cut by the driving of the second pump 28; thus, it is expected that the fuel efficiency of the vehicle 14 is improved. In this case, the driving of the second pump 28 is continued.

On the other hand, as illustrated in FIG. 3B, if the amount of workload cut in the first pump 20 is less than the amount of workload loss of the ACG 38, the entire workload of the hydraulic control device 10 increases due to the driving of the second pump 28; thus, the fuel efficiency of the vehicle 14 may deteriorate. In this case, the second pump 28 is stopped or the second pump 28 is set to a low-rotation state, so that the first pump 20 supplies the first oil to the continuously variable transmission mechanism 50 through the check valve 52.

<2. 2 Description of Specific Process Operation>

Figure 3:
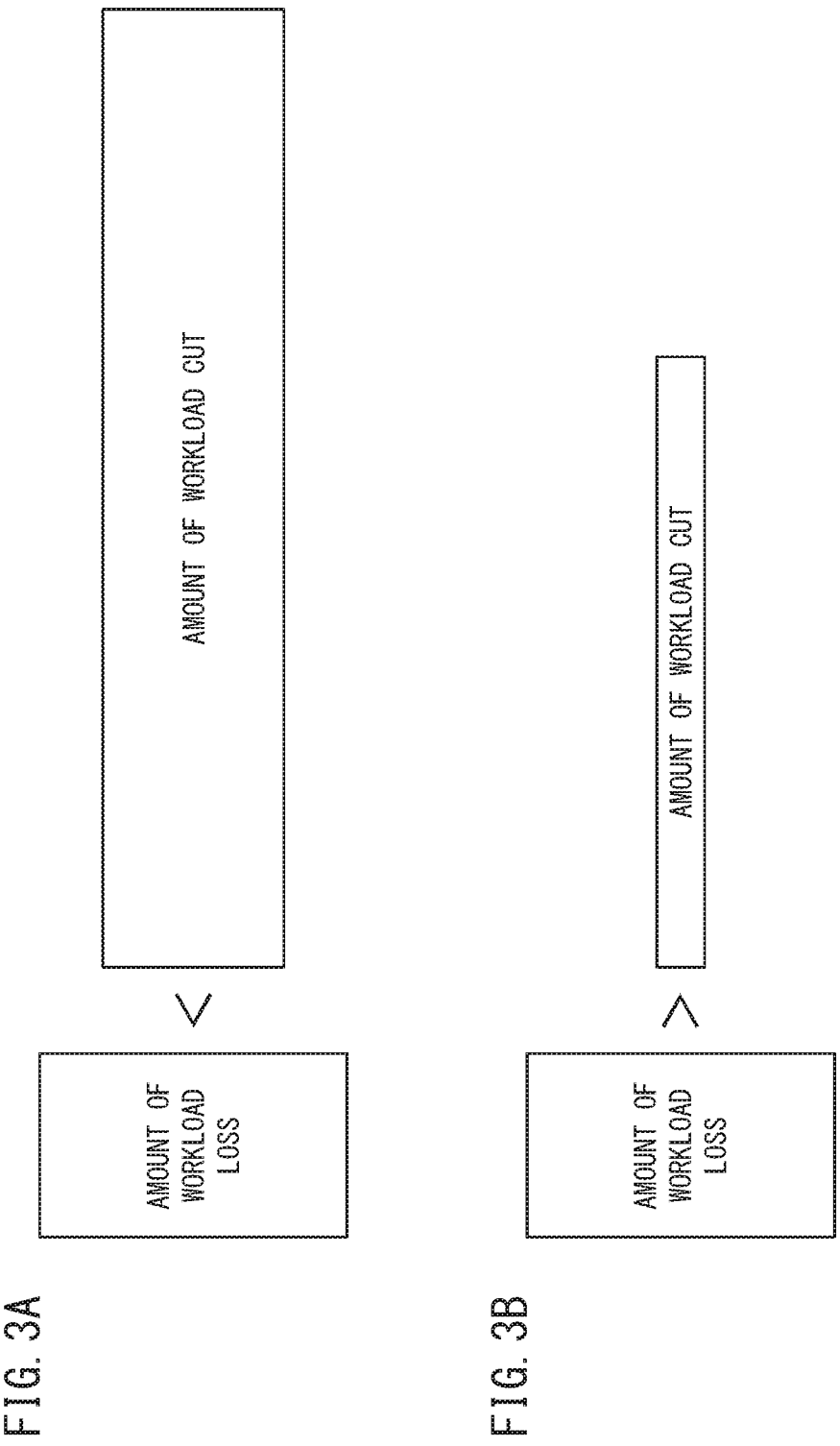
FIG. 3A is an explanatory diagram illustrating an ideal driving circumstance.
FIG. 3B is an explanatory diagram illustrating a driving circumstance where a second pump is to be stopped or set to a low-rotation state.
Figure 4:
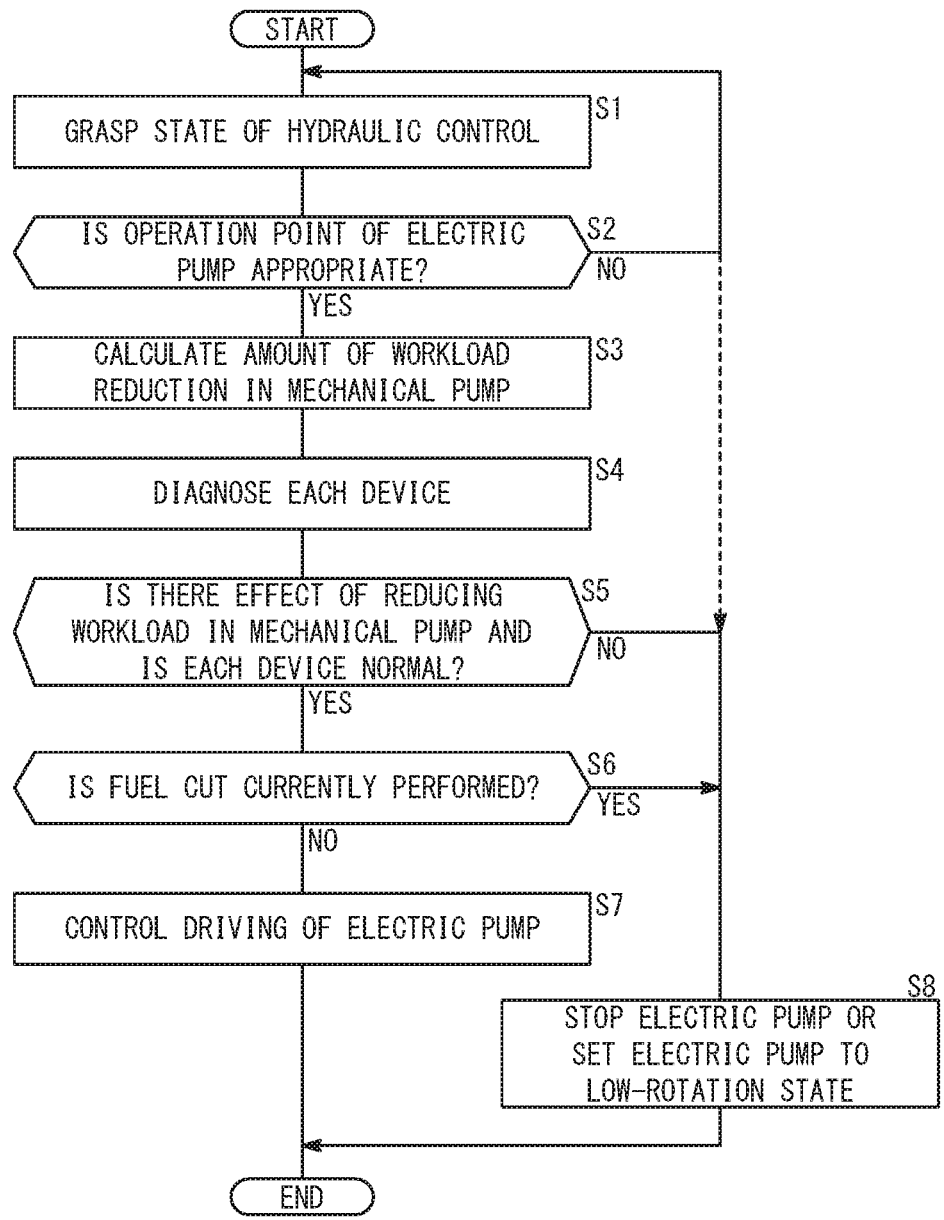
FIG. 4 is a flowchart of an operation of the hydraulic control device in FIG. 1.

Next, with reference to the flowchart in FIG. 4, description is given concerning an operation of the control unit 26 to specifically achieve the principle of the operation process described in FIG. 2 to FIG. 3B. Here, the description is given with reference to FIG. 1 to FIG. 3B as necessary. Note that the process in FIG. 4 is repeatedly performed at predetermined time intervals.

In step S1 in FIG. 4, the control state estimation unit 26a grasps the state of the hydraulic control of the hydraulic system in the transmission 12. As described above, the detection signals are sequentially input from the various sensors in the vehicle 14 to the control unit 26. Thus, by using the lateral pressure (pulley pressure) as a command value, the control state estimation unit 26a estimates the line pressure PH based on the command value. The control state estimation unit 26a estimates the pressure P3 in consideration of the operation status of the hydraulic operation unit of the low-pressure system, such as the lockup clutch 88. In addition, the control state estimation unit 26a estimates the flow rate of the second oil (the flow rate for shift) to be supplied to the continuously variable transmission mechanism 50 in the shift operation, and the leak amount of oil in the hydraulic system in the transmission 12, on the basis of the lateral pressure corresponding to the command value etc.

In the next step S2, the operation point decision unit 26b calculates the differential pressure $\Delta P$ ($\Delta P=PH-P3$) by subtracting the pressure P3 from the line pressure PH estimated by the control state estimation unit 26a. In addition, the operation point decision unit 26b calculates the flow rate (necessary flow rate) Q of the second oil to be discharged from the second pump 28 by summing up the leak amount and the flow rate for shift estimated by the control state estimation unit 26a. Next, the operation point decision unit 26b decides the operation point of the second pump 28 by using the differential pressure ΔP and the necessary flow rate Q. Next, the operation point decision unit 26b calculates the pressure of the second oil that can be actually discharged from the second pump 28, and on the basis of the calculated pressure and the operation point, the operation point decision unit 26b determines whether the operation point is in the range of the discharging capability of the second pump 28. If the operation point is in the range of the discharging capability (step S2: YES), the operation point decision unit 26b sets the decided operation point as the operation point of the second pump 28, and the process advances to the next step S3. On the other hand, if the operation point is not in the range of the discharging capability (step S2: NO), the process returns to step S1 and the process of step S1 is repeated.

In step S3, the workload calculation unit 26c calculates the amount of workload reduction in the first pump 20 that is reduced by the driving of the second pump 28. In this case, the workload calculation unit 26c calculates the workload when the first pump 20 is operated alone (a first workload) and the workload of the first pump 20 when both the first pump 20 and the second pump 28 are operated (a second workload) in such a way that: the discharging flow rate of the first pump 20 is estimated on the basis of the engine rotation number New (the rotation number Nmp of the first pump 20) from the engine rotation number sensor 92, and the estimated discharging flow rate and the line pressure PH estimated by the control state estimation unit 26a are multiplied. Alternatively, the workload calculation unit 26c may calculate the workload of the first pump 20 by using the engine rotation number New and an estimated value of the friction torque of the first pump 20.

Next, the workload calculation unit 26c estimates the power consumption (workload) of the second pump 28 (the motor 30) by using the operation point of the second pump 28 that is estimated by the operation point decision unit 26b or using the torque and the rotation number Nep of the second pump 28 (the rotation number Nem of the motor 30). On the basis of the estimated power consumption of the second pump 28 and the power generation efficiency of the ACG 38, the workload calculation unit 26c estimates the amount of workload loss (power generation workload) of the ACG 38.

Next, the workload calculation unit 26c calculates the amount of workload reduction in the first pump 20 by subtracting the second workload and the amount of workload loss of the ACG 38 from the first workload.

In step S4, the diagnosis unit 26f diagnoses the state of each part in the vehicle 14 on the basis of the detection results of the various sensors in the vehicle 14. For example, the diagnosis unit 26f diagnoses the state of the battery 42 on the basis of the voltage V of the battery 42 that is detected by the voltage sensor 44 and the current I that is detected by the current sensor 46.

In step S5, the workload determination unit 26d determines whether the amount of workload reduction that is calculated in the workload calculation unit 26c is more than a predetermined threshold α and whether each part in the vehicle 14 is normal. If the amount of workload reduction is more than the predetermined threshold α and each part in the vehicle 14 is normal (step S5: YES), the workload determination unit 26d determines whether the fuel cut for the engine 16 is being performed on the basis of the opening of the accelerator pedal that is detected by the accelerator sensor 98 in the next step S6.

It is desirable that the threshold α is set arbitrarily in accordance with the weight of the vehicle 14, the type of the power plant including the engine 16 and the transmission 12, and the place to which the vehicle 14 is shipped, etc. Alternatively, with a map of the threshold α that is not shown, the threshold α may be variably set by selecting a desired threshold α by searching the map with the use of the vehicle speed Vs and the oil temperature To.

In the case where the fuel cut is not being performed (step S6: NO), upon reception of the determination result from the workload determination unit 26d, the motor controller 26e determines that the workload of the first pump 20 is reduced if the second pump 28 is operated at the operation point that is decided by the operation point decision unit 26b, and thus, a control signal based on the operation point is supplied to the driver 32 in the next step S7. Accordingly, the driver 32 can drive the motor 30 on the basis of the supplied control signal and can rotate the second pump 28.

On the other hand, if the determination result in step S5 is negative (step S5; NO), the process advances to step S8. In step S8, the motor controller 26e determines that the amount of workload reduction is less than or equal to the threshold α and the effect of reducing the workload of the first pump 20 by the operation of the second pump 28 cannot be obtained, or that some device in the vehicle 14 has an abnormality and appropriate hydraulic control for the transmission 12 cannot be performed. Then, the motor controller 26e ignores the operation point decided by the operation point decision unit 26b and supplies the driver 32 with a control signal to instruct it to stop the second pump 28 or to operate the second pump 28 in a low-rotation state.

On the basis of the supplied control signal, the driver 32 stops the motor 30 or controls the motor 30 into a low-rotation state. Thus, the second pump 28 stops or is operated in a low-rotation state. As a result, as the flow rate of the second oil decreases (as the pressure of the second oil decreases), the check valve 52 is opened, so that the first pump 20 supplies the first oil to the continuously variable transmission mechanism 50 through the check valve 52.

Even if the determination result in step S5 is positive, the process advances to step S8 when the determination result in step S6 is positive (steps S5, S6: YES). In this case, though devices in the vehicle 14 are normal and the amount of workload reduction is more than the threshold α, the fuel cut is currently being performed; therefore, the motor controller 26e determines that the improvement of the fuel efficiency thanks to the fuel cut may be canceled out by the amount of workload loss of the ACG 38 etc. That is to say, in the case where the fuel cut is being performed, the fuel is not consumed, or is consumed in smaller quantity. Then, even if the first pump 20 is burdened less and the workload of the first pump 20 can be reduced, the increase of the amount of workload loss of the ACG 38 due to the operation of the second pump 28 may result in deterioration of fuel efficiency. In this case, too, the motor controller 26e performs the process in step S8 and stops the second pump 28 or operates the second pump 28 in the low-rotation state.

In the above description, if the determination result in step S2 is negative (step S2: NO), the process may advance to step S8 as shown by the dashed line in FIG. 4, so that the second pump 28 is stopped or operated in the low-rotation state. This is because if the operation point is not in the range of the discharging capability of the second pump 28, it may be impossible to perform appropriate hydraulic control even if the control signal based on this operation point is supplied to the driver 32.

3. Effect of the Present Embodiment

As described above, in the hydraulic control device 10 according to the present embodiment, if the amount of workload loss of the ACG 38 is more than the amount of workload cut in the first pump 20, driving the second pump 28 may deteriorate the fuel efficiency of the vehicle 14. In this case, the motor 30 is stopped or the rotation number Nem is decreased, so that the second pump 28 is stopped or set to the low-rotation state. Thus, the second pump 28 is operated normally only when it is expected that the fuel efficiency is improved. As a result, the second oil can be supplied efficiently to the continuously variable transmission mechanism 50 or the like without deteriorating the fuel efficiency. In addition, since the second pump 28 is not driven wastefully, abrasion of the rotating parts of the second pump 28 or deterioration of durability can be suppressed.

The workload calculation unit 26c calculates the amount of workload cut by subtracting the second workload and the workload of the second pump 28 from the first workload of the first pump 20; thus, the workload determination unit 26d can perform the determination process accurately.

Specifically, the workload calculation unit 26c calculates the amount of workload reduction in the first pump 20 based on the amount of workload cut by subtracting the second workload and the amount of workload loss from the first workload, and the workload determination unit 26d determines whether the amount of workload reduction is more than the predetermined threshold α. If the workload determination unit 26d determines that the amount of workload reduction is less than or equal to the threshold α, the motor controller 26e stops the motor 30 or decreases the rotation number Nep. By setting the threshold α in this manner, the workload determination unit 26d can perform the determination process accurately in consideration of a certain degree of margin.

In addition, even if the amount of workload loss is less than or equal to the amount of workload cut, the motor controller 26e may stop the motor 30 or decrease the rotation number of the motor 30 when the fuel cut for the engine 16 is performed. Thus, it is possible to prevent the driving of the second pump 28 from canceling out the improvement of the fuel efficiency by the fuel cut.

The present invention is not limited to the above embodiment and may employ various structures on the basis of the description in the present specification.

What is claimed is:

1. A hydraulic control device including, between a first pump and a hydraulic operation unit of a transmission, a second pump and a check valve connected in parallel and configured to supply first oil from the first pump to the hydraulic operation unit through the check valve, or pressurize the first oil that is supplied from the first pump with the second pump and supply the first oil that has been pressurized to the hydraulic operation unit as second oil, the first pump being a mechanical pump configured to be driven by an engine of a vehicle including the transmission, the second pump being an electric pump configured to have a smaller capacity than that of the first pump and to be driven by a motor that rotates by power supplied from a power generator that generates power by a rotation of the engine, and the hydraulic control device comprising:
a workload calculation unit configured to calculate an amount of workload cut in the first pump when supply of the first oil from the first pump to the hydraulic operation unit through the check valve is switched to supply of the second oil from the second pump to the hydraulic operation unit;
a workload determination unit configured to determine whether an amount of workload loss based on an amount of power generated by the power generator is more than the amount of workload cut; and
a motor controller configured to stop the motor or decrease a rotation number of the motor if the workload determination unit determines that the amount of workload loss is more than the amount of workload cut.

2. The hydraulic control device according to claim 1, wherein the workload calculation unit is configured to calculate a first workload of the first pump when the first pump supplies the first oil to the hydraulic operation unit through the check valve, a second workload of the first pump when the first pump supplies the first oil to the second pump in a case where the second pump is driven, and a workload of the second pump, and calculate the amount of workload cut by subtracting the second workload and the workload of the second pump from the first workload.

3. The hydraulic control device according to claim 2, wherein:
the workload calculation unit is configured to calculate an amount of workload reduction based on the amount of workload cut by subtracting the second workload and the amount of workload loss from the first workload;
the workload determination unit is configured to determine whether the amount of workload reduction is more than a predetermined threshold; and
in a case where the workload determination unit determines that the amount of workload reduction is less than or equal to the threshold, the motor controller is configured to stop the motor or decrease the rotation number of the motor.

4. The hydraulic control device according to claim 3, wherein the threshold is set on a basis of a weight of the vehicle, a type of a power plant of the vehicle including the engine and the transmission, a place to which the vehicle is shipped, a vehicle speed of the vehicle, or an oil temperature of the first oil or the second oil.

5. The hydraulic control device according to claim 1, wherein even if the amount of workload loss is less than or equal to the amount of workload cut, the motor controller is configured to stop the motor or decrease the rotation number of the motor when fuel cut for the engine is performed.

* * * * *